(12) United States Patent
Dearman et al.

(10) Patent No.: US 8,700,638 B2
(45) Date of Patent: Apr. 15, 2014

(54) COMPUTER-IMPLEMENTED WEIGHTED TREE SEARCH TO RESOLVE VARIABLE NAME AMBIGUITY

(75) Inventors: Michael Dearman, Lakewood, NY (US); Albert Cecchini, Jamestown, NY (US)

(73) Assignee: Libera, Inc., Jamestown, NY (US)

( * ) Notice: Subject to any disclaimer, the term of this patent is extended or adjusted under 35 U.S.C. 154(b) by 0 days.

(21) Appl. No.: 13/415,244

(22) Filed: Mar. 8, 2012

(65) Prior Publication Data
US 2013/0073562 A1 Mar. 21, 2013

Related U.S. Application Data

(60) Provisional application No. 61/450,227, filed on Mar. 8, 2011.

(51) Int. Cl.
*G06F 17/30* (2006.01)

(52) U.S. Cl.
USPC ............ 707/748; 707/692; 707/755; 707/811

(58) Field of Classification Search
None
See application file for complete search history.

(56) References Cited

U.S. PATENT DOCUMENTS

| | | | | |
|---|---|---|---|---|
| 6,356,911 | B1 * | 3/2002 | Shibuya ................................ | 1/1 |
| 6,477,515 | B1 * | 11/2002 | Boroujerdi et al. ............. | 706/14 |
| 6,510,434 | B1 * | 1/2003 | Anderson et al. ...................... | 1/1 |
| 6,704,320 | B1 * | 3/2004 | Narvaez et al. ............... | 370/408 |
| 7,538,770 | B2 * | 5/2009 | Chen ............................. | 345/440 |
| 8,000,891 | B2 * | 8/2011 | Powell et al. .................. | 701/527 |
| 8,200,700 | B2 * | 6/2012 | Moore et al. ................... | 707/791 |
| 8,280,574 | B2 * | 10/2012 | Yabushita et al. ............... | 701/25 |
| 2003/0050915 | A1 * | 3/2003 | Allemang et al. ................ | 707/1 |
| 2004/0078236 | A1 * | 4/2004 | Stoodley et al. .................. | 705/2 |
| 2005/0273771 | A1 * | 12/2005 | Chang et al. .................. | 717/136 |
| 2006/0179068 | A1 * | 8/2006 | Warner et al. ................. | 707/100 |
| 2009/0138503 | A1 * | 5/2009 | Chowdhury ............... | 707/104.1 |
| 2009/0222473 | A1 * | 9/2009 | Chowdhury .................. | 707/102 |
| 2012/0221604 | A1 * | 8/2012 | Gao et al. ...................... | 707/797 |

OTHER PUBLICATIONS

Chandy, Distributed Computation on Graphs: Shortest Path Algorithms, Programming Techniques and Data Structures, Communications of the ACM, vol. 25, No. 11, pp. 833-837, Nov. 1982.*

* cited by examiner

*Primary Examiner* — Neveen Abel Jalil
*Assistant Examiner* — Karina Levitian
(74) *Attorney, Agent, or Firm* — Baker & Hostetler LLP

(57) ABSTRACT

Resolving ambiguous variable names in processing of a computer application includes representing variable declarations with dynamic variable scopes of the computer application in a tree data structure where the nodes of the tree data structure are variable names of the computer application. Ambiguous variable names are resolved by calculating distances between a context node and two or more candidate nodes of the tree data structure where each of the candidate nodes contains the searched variable name. The weighted distance between the context node and each candidate node equals the number of downward steps from the context node to the candidate node multiplied by a first constant plus the number of upward steps from the context node to the candidate node multiplied by a second constant. The node having a desired weighted distance is selected and information from the selected node is returned to the computer application as the variable value.

14 Claims, 3 Drawing Sheets

COMPUTER-IMPLEMENTED WEIGHTED TREE SEARCH TO RESOLVE VARIABLE NAME AMBIGUITY

CROSS REFERENCE TO RELATED APPLICATION

This application is a non-provisional application that claims the priority of U.S. Provisional Patent application No. 61/450,227, entitled "Computer-Implemented Weighted Tree Search" filed on Mar. 8, 2011, the teachings of which are incorporated by reference herein.

TECHNICAL FIELD

Embodiments of the invention relate generally to the field of computer searching and more specifically to methods for searching a data tree structure.

BACKGROUND

A tree is a data structure that is an acyclic connected graph where the nodes of the graph each have zero or more children nodes and at most one parent node. FIG. 1 illustrates a tree data structure that depicts the relationships between the nodes of the tree data structure in accordance with the prior art. A node is a basic unit of a data structure that may contain a value, a condition, or represent a separate data structure. In a tree data structure, each node has zero or more child nodes, which are below it in the tree. By convention, as shown in FIG. 1, trees are depicted growing downwards.

Searching a tree data structure is done several different ways, in which most searches will include a tree traversal, which is the process of visiting (examining and/or updating) each node in a tree data structure, exactly once, in a systematic way. When traversing a tree, a search returns a desired value by extracting it from a node of the tree. Such an extraction will often include a reference to the particular location of the node as well. The location can be identified explicitly or relative to other nodes. Where the node is identified relative to another node, the distances between nodes can be measured in steps, where one step is basically a direct link between a child node and its parent. For example, in FIG. 1, walking from node "A" to "E" is two steps, and walking from "D" to "E" is two steps. Walking from node "D" to "C" is three steps, which includes two upwards steps from "D" to "A" and one downward step from "A" to "C". To illustrate this point further, the distance between "E" and "F" is four steps. Note that a step is in a downward or upward direction.

Because of the nature of a tree data structure it is not out of the ordinary in a search to find the same searched value at several nodes in the tree. It is also possible for such nodes to be the same distance from the node initiating the search, in which the nodes will have the same relative locations.

This creates ambiguity and decreases the effectiveness of the search. That is, ambiguity occurs in a search of a tree when the same values occur at different nodes of a tree. Ambiguity may be resolved by comparing the distance of walking through a tree to get from the node that the search is initiated (i.e. the context node) to the nodes that contain the searched value (i.e. the candidate nodes). The distance is measured in units of steps, where one step is one edge between a child node and its parent, whether that step is upward or downward. Such occurrences are distinguishable when they occur at various distances from the context node. This is not the case when occurrences are the same number of steps from the context node. If only one instance of the value is desired in a search of a tree, a method must be employed to determine which instance to return. A technique is desired for eliminating this ambiguity in the search results.

SUMMARY

Embodiments of the invention provide methods for resolving ambiguity in a search of a tree data structure having a plurality of nodes. Ambiguity occurs when a searched value occurs at two or more nodes of the tree data structure. Weighted distances between a context node and two or more candidate nodes are determined. Each of the candidate nodes contains the searched value. The weighted distance between the context node and each candidate node equals the number of downward steps from the context node to the candidate node multiplied by a first constant plus the number of upward steps from the context node to the candidate node multiplied by a second constant. The node having a desired weighted distance is selected. Information from the selected node is returned.

For one embodiment, ambiguity is resolved by weighting the steps differently depending on whether the steps are upward or downward. For example, when calculating the distance from the context node to the candidate nodes an upward step contributes to a greater weighted distance than a downward step. For such an embodiment, when multiple walks are taken through a tree, where the number of steps is equal per walk, but one of the walks has more upward steps than the other, the walk with more upward steps will have a greater weighted distance and its respective searched value will have a greater distance associated with it.

For one embodiment, the method is a programmatic event handler occurring at a context node source code of a computer application, where the event handler receives a value to be searched. The triggering of the event causes a call to a sub-method, where the sub-method runs a search for nodes containing the searched value. As a result of finding all instances of the value in the tree, the sub-method executes a logic function sub-method to calculate a weighted return value. The return value could be as simple as the identified node including the searched value or as complicated as millions of nodes weighted and sorted by weight and including the searched value. The logic function sub-method in determining the return value can be adjusted by an additional sub-method to select just the searched value, the node or nodes having the searched value, or the node that has a desired weighted distance from the context node. For one embodiment, the desired weighted distance from the context node may be the least weighted distance from the context node, the furthest weighted distance from the context node, or any location in between.

In addition to resolving ambiguity, embodiments of the invention may also address search speed. For example, in one embodiment, stored weighted distances between nodes or positions of nodes (which are used for calculating weighted distances) are used to make the search more efficient. The stored weighted distances or nodal positions are stored in a relational database table or another type of data structure optimal for searching (e.g. a flat B-tree data structure). By storing such information prior to a search, the determination of which node or instance of a value to select is done quickly without a tree traversal per search. Determining the nodes without a tree traversal reduces search time as tree traversal requires walking to every node of a tree data structure.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

A method for resolving ambiguity in a search of a tree data structure for one embodiment includes weighting the steps of a tree walk differently when a searched value occurs at different nodes that are an equal number of steps from a context node. For one embodiment of the invention, the steps are weighted differently depending on whether the steps are upward or downward. For one such embodiment, when calculating the distance from the context node to the candidate nodes an upward step contributes to a greater weighted distance than a downward step. For example, when multiple walks are taken through a tree, where the number of steps is equal per walk, but one of the walks has more upward steps than the other, the walk with more upward steps will have a greater weighted distance and its respective searched value will have a greater distance associated with it.

In the following description, numerous specific details are set forth. However, it is understood that embodiments of the invention may be practiced without these specific details. In other instances, well-known architectures, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Embodiments of the invention are applicable in a variety of settings in which tree data structures are searched and the searched values referenced or used.

Figure 1:
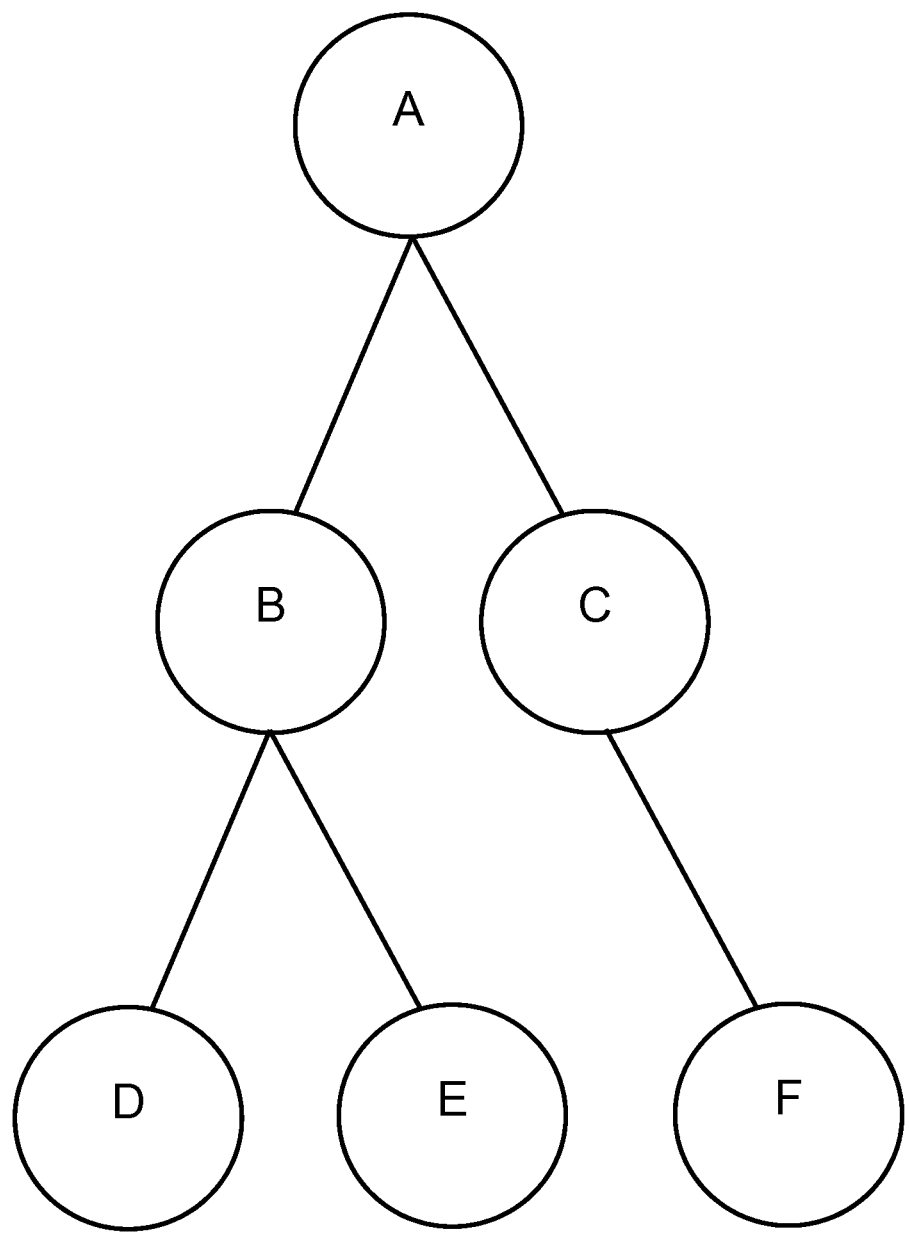
FIG. 1 illustrates a tree data structure that depicts the relationships between the nodes of the tree data structure in accordance with the prior art.
Figure 2:
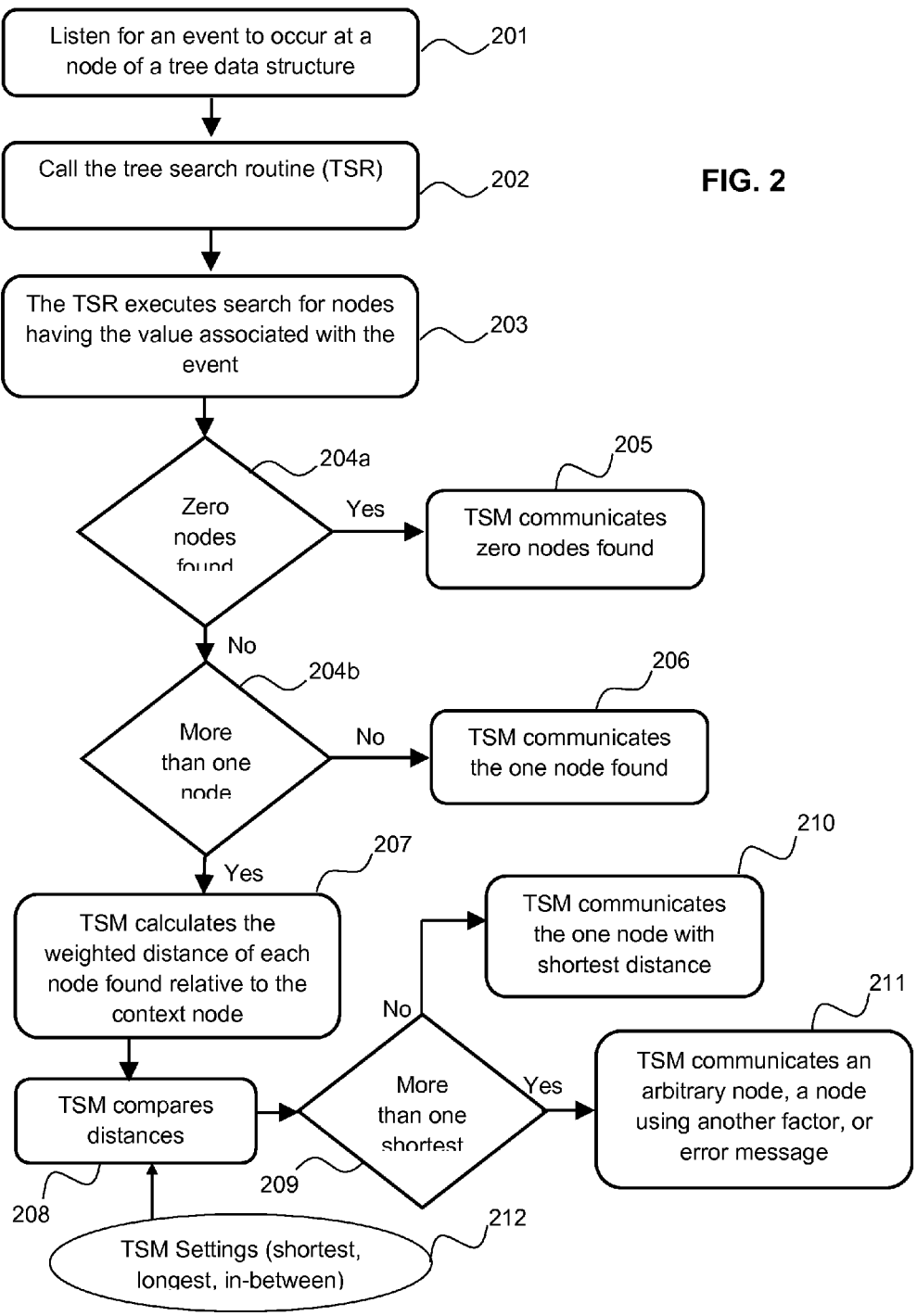
FIG. 2 illustrates a method for resolving ambiguity in a tree data structure in accordance with one embodiment of the invention.

FIG. 2 illustrates a method for resolving ambiguity in a tree data structure in accordance with one embodiment of the invention. In this embodiment, the tree search method (TSM) may be implemented by a computing system as described below in reference to FIG. 3. The method illustrated in FIG. 2 begins with operation 201 in which an event handler method listens for an event to occur at a context node of a tree data structure, where the event is associated with a value to be searched. At operation 202, upon hearing the event, a tree search routine (TSR) is called.

At operation 203, the TSR executes a search for nodes having the value to be searched. The methods of the event handler can be software or firmware based and embedded in user interfaces consisting of tree-grids, dialog boxes, forms, fields, or any data entry point with user interaction. The methods may also be embedded in interfaces to other software or firmware routines within an application or between applications running on the same computer or upon a plurality of computer systems. For example, in cases where the event is a user event or a client-driven event, the event occurs in forms and fields of a computer application and the nodes of interests are the fields of the computer application. The user event may include a user entering a string into a field and submitting the string, where the string is submitted as a search value. The context node may be a field of a user interface and the nodes searched are different fields of the same or another user interface. In one embodiment of the methods, the nodes of interest are forms of a computer application or various user interfaces. In such an embodiment, a computer application may comprise a user interface implemented by XML, and the nodes of interest are nodes of XML files within the computer application. In another embodiment, a computer application may comprise variable declarations in different enclosing variable scopes, and the nodes of interests are the variable names, where the variable names may be non-unique and require disambiguation to complete a worthwhile search.

At operation 204a a determination is made of the number of nodes having the searched value. If no nodes of the tree structure contain the searched value, then zero nodes found is communicated at operation 205. For example, the TSM may communicate zero nodes found by returning a null value. If one node of the tree structure is found at step 204b to contain the searched value, then the node is returned at operation 206. If multiple nodes of the tree structure are found to contain the searched value, then the weighted distances from the context node to the nodes found to contain the searched value are calculated at operation 207. For one embodiment, each weighted distance equals the number of downward steps multiplied by a first constant plus the number of upward steps multiplied by a second constant. For one such embodiment, the second constant may be a number much greater than the first constant (e.g., Weighted distance from the context node= (Downward steps*A)+(Upward steps*B); where B>>A). As can be inferred from the equation, the number of upward steps has a much greater effect on increasing the weighted distance from the context node.

At operation 208 the calculated weighted distances are compared to determine the relative distances of the multiple nodes. At operation 209 a determination is made as to whether more than one node has the shortest weighted distance. If one node has the shortest weighted distance, that node is communicated at operation 210. If more than one node has the shortest weighted distance, an arbitrary node of those nodes having the shortest weighted distance may be selected. Alternatively, an additional factor may be used to select a node from those nodes having the shortest weighted distance or an error message may be returned at operation 211.

For one embodiment, the method need not determine the shortest weighted distance, but may instead determine a desired weighted distance. For example, the desired weighted distance may be the longest weighted distance or any user or machine specified value between the two extremes. For one such embodiment, the desired weighted distance is a variable setting which can be changed by a TSM settings method 212.

For one embodiment of the invention, the weighted distances are predetermined and stored after an initial traversal of the tree that may occur periodically in the background or upon loading a session of a computer application associated with the tree. Alternatively, the node locations may be stored so that the locations can be retrieved quickly for calculating weighted distances. When storing such predetermined information it is preferred to store it in an optimal data structure for search and retrieval, such as a flat data structure (e.g. flat file database such as B-Tree), a hash table, a linked list, a relational database table, or an XML file. As mentioned above, by storing such information prior to a search, the determination of which node or instance of a value to select in a search is done quickly without a tree traversal per search.

Figure 3:
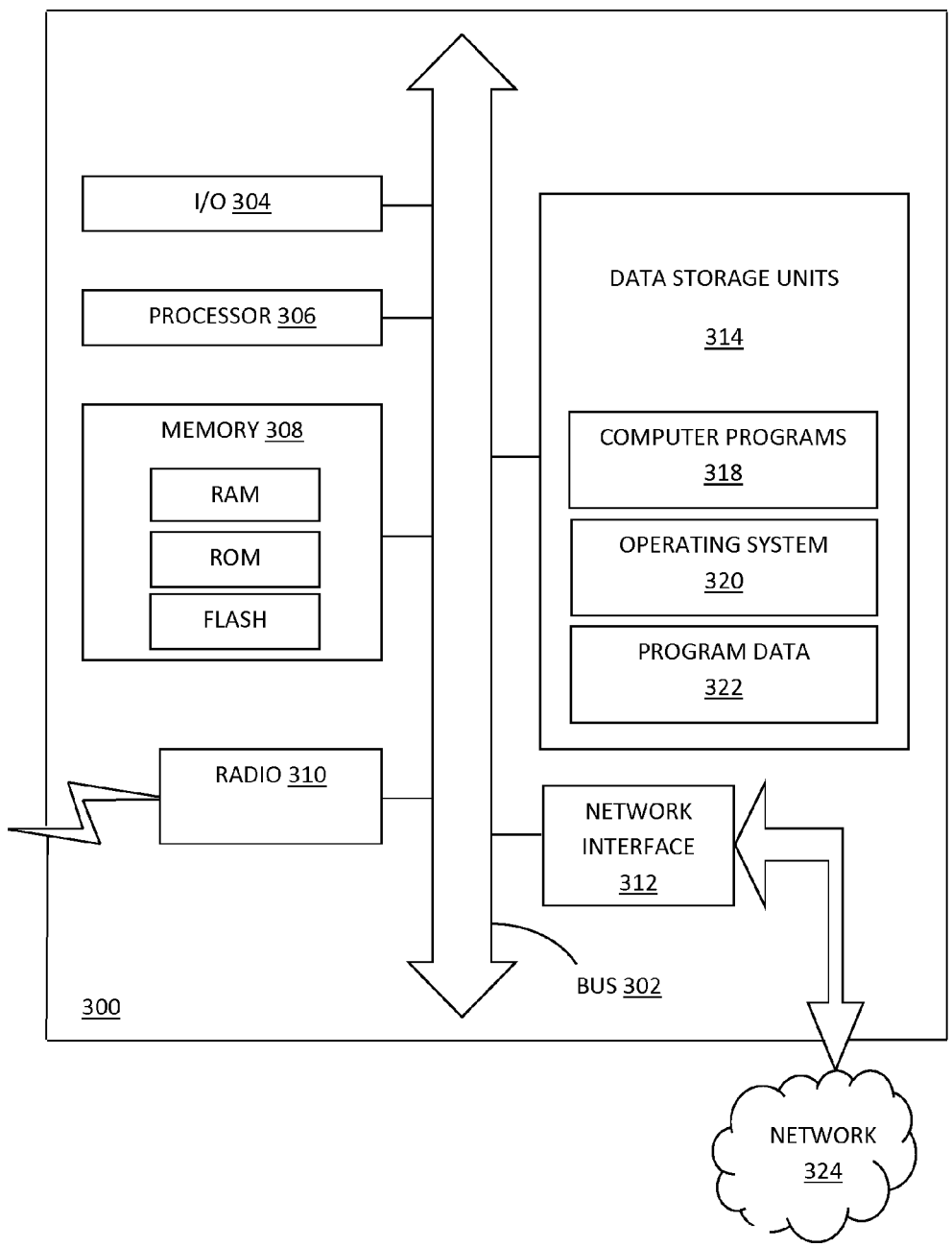
FIG. 3 illustrates an exemplary computing system implementing a tree data structure ambiguity resolution method in accordance with one embodiment of the invention.

FIG. 3 illustrates an exemplary computing system implementing a tree data structure ambiguity resolution method in accordance with one embodiment of the invention. The computing system shown in FIG. 3 includes a computer 300 running hardware, software, and/or firmware that facilitate performance of the methods in accordance with embodiments of the invention. The computer 300 includes a processor 306 in communication with a computer readable storage medium, where the computer readable storage medium is any medium that stores information for retrieval later by the processor 306. In an exemplary embodiment, the computer readable storage medium includes memory 308 and data storage units 314. Memory 308 may be a fast-access memory and is used to run program instructions executable by the processor 306. Memory 308 also may be random access memory (RAM), read only memory (ROM), and/or flash memory.

Data storage units 314 may be physical devices and are used to store any data and instructions that may be accessed by the processor 306, such as program data 322 and instructions for computer programs 318 and an operating system 320. Data storage units 314 may be an optical medium, a magnetic medium such as a floppy disk, a compact disc (CD), a digital video disk (DVD), and/or a solid-state medium such as RAM, ROM, and flash memory.

The computer programs 318 are any computer software that assists a user to perform a task or multiple related tasks. For example, the methods described herein are preferably implemented by one of the computer programs 318, which is in the form of computer instructions that when executed by a processor cause the processor to implement each of the steps of the methods described herein. The methods described herein in accordance with various alternative embodiments may also be implemented by processing hardware- or firmware-based instructions that when executed by a processor also cause the processor to implement each of the steps of the methods described herein.

The computer 300 also includes a radio 310 or another type of communications device for wirelessly transmitting and receiving data. In addition, the computer 300 may operate in a networked environment using logical connections to other computers and communication devices via network 324. The computer 300, other computers, and communication devices may be a personal computer, a server, a router, a network PC, a peer device, a printer, or other common network nodes. When used in a LAN or WLAN networking environment, the computer 300 is connected to the other computers and communication devices via the LAN or WLAN through a network interface 312.

The computer 300 also includes input/output devices 304 for providing input to the processor 306, the memory 308, the radio 310, the storage units 314, the network interface 312, and other electrical components of the computer 300 and the output of the electrical components of the computer 300 to other electrical components of the computer 300, other electrical components of other computers, or a user of the computer 300 or other computers. For example, a display device provides output of the electrical components to a user.

A bus 302 and other circuitry assist in connecting the input/output devices (I/O) 304 to various electrical components of the computer 300. The above-mentioned applications programs and the electrical components of the computer are made of computer hardware, software, firmware, or any combination thereof. The communications among such components occur in the form of signals including electronic signals, electromagnetic signals, optical signals, or any combination thereof.

Though various embodiments of the present invention have been described above, it should be understood that embodiments have been presented by way of example, and not limitation. A person of ordinary skill in the art will recognize that there are various changes that can be made to the present invention without departing from the spirit and scope of the present invention. Therefore, the invention should not be limited by any of the above-described example embodiments, but should be defined only in accordance with the following claims and equivalents of the claimed invention.

What is claimed:

1. A method for resolving ambiguity in processing of a computer application having variables with variable declarations with dynamic variable scopes, the method comprising: representing the variable declarations with dynamic variable scopes of the computer application in a tree data structure, where nodes of the tree data structure are variable names of the computer application; when the computer application executes code or an event from a particular node in the tree data structure and asks for a value of the variable for the particular node but finds a searched variable name at two or more nodes of the tree data structure, a processor calculating weighted distances between a context node and two or more candidate nodes of the tree data structure, each candidate node containing the searched variable name, where the weighted distance equals a number of downward steps from the context node to a candidate node multiplied by a first constant plus a number of upward steps from the context node to the candidate node multiplied by a second constant;

the processor selecting a node from the candidate nodes having a desired weighted distance; and the processor returning information from the selected node to the computer application as the value for the variable, wherein the tree data structure is derived from an XML tree structure of the computer application and the nodes are XML files within the computer application.

2. The method of claim 1 wherein the second constant is greater than the first constant and the desired weighted distance is a shortest weighted distance.

3. The method of claim 1, where the method is initiated by an event occurring at the context node and the occurrence of the event causes a call to be communicated over a bus to the computer application to run the search, determine the weighted distances, select the node and return the information from the selected node.

4. The method of claim 1, wherein the information from the selected node is an object representing the selected node.

5. The method of claim 1, wherein the information from the selected node is the variable name and variable storage location.

6. The method of claim 1, wherein the weighted distances between the plurality of nodes of the tree data structure are stored after an initial traversal of the tree data structure.

7. The method of claim 6, where the initial traversal occurs periodically during a session of the computer application or upon loading a session of the computer application.

8. The method of claim 6, where the weighted distances are stored in one or more data structures selected from the group including: a hash table; a linked list; a relational database table; a flat data structure; and an extensible markup language file.

9. The method of claim 1, where the locations of all the nodes in the tree data structure are stored after an initial traversal for quick retrieval for calculating weighted distances.

10. The method of claim 9, where the initial traversal occurs periodically during a session of the computer application or upon loading a session of the computer application.

11. The method of claim 3, where the event is at least one of the following:
  a user event;
  a client-driven event; or
  a user entering a string into a field and submitting the string, where the field needs to resolve other variable names in scope in order to process the submitted string.

12. The method of claim 1, where the plurality of nodes of the tree data structure are variables selected from the group comprising tree-grids, dialog boxes, forms of a computer application, fields of a user interface, and a data entry point with user interaction.

13. The method of claim 1,
  wherein the computer application has a user interface implemented by extensible markup language.

14. The method of claim 1, wherein the method is implemented in software or firmware on the processor.

* * * * *